US012531358B2

(12) United States Patent
Ashibu

(10) Patent No.: US 12,531,358 B2
(45) Date of Patent: Jan. 20, 2026

(54) BOARD-TO-BOARD CONNECTOR

(71) Applicant: Japan Aviation Electronics Industry, Ltd., Tokyo (JP)

(72) Inventor: Kenta Ashibu, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 305 days.

(21) Appl. No.: 18/379,844

(22) Filed: Oct. 13, 2023

(65) Prior Publication Data

US 2024/0170869 A1 May 23, 2024

(30) Foreign Application Priority Data

Nov. 18, 2022 (JP) ................................ 2022-184706

(51) Int. Cl.
*H01R 12/71* (2011.01)
*H01R 13/41* (2006.01)

(52) U.S. Cl.
CPC ........... *H01R 12/712* (2013.01); *H01R 13/41* (2013.01)

(58) Field of Classification Search
CPC .................................................... H01R 12/712
USPC ............................................ 439/66, 83, 682
See application file for complete search history.

(56) References Cited

U.S. PATENT DOCUMENTS 9,882,296 B1 * 1/2018 Ju ...................... H01R 13/2435
11,777,258 B2 * 10/2023 Tan ........................ H01R 13/41 439/108
2009/0253301 A1 10/2009 Chang et al.
2021/0075178 A1 * 3/2021 Hwang ................ H01R 13/506

FOREIGN PATENT DOCUMENTS

CN 2736972 Y 10/2005

OTHER PUBLICATIONS

Office Action for Taiwanese Patent Application Serial No. 112136914, dated Oct. 1, 2024, 7 pages.
Office Action for Taiwanese Patent Application No. 112136914, dated May 28, 2024, 12 pages.

* cited by examiner

*Primary Examiner* — Phuong K Dinh
(74) *Attorney, Agent, or Firm* — Lippes Mathias LLP

(57) ABSTRACT

A board-to-board connector includes a contact and a housing accommodating the contact. The contact includes a mounting part solderable to a main electrode pad, and a spring part extending from the mounting part. The spring part includes a contact part configured to come into contact with the sub-electrode pad, and a restrained part to be restrained by the housing. The mounting part is soldered to the main electrode pad in a state where the restrained part is restrained by the housing. In a state where the mounting part is soldered to the main electrode pad, the contact part comes into contact with the sub-electrode pad and is displaced, and thereby the restrained part changes from a restrained state of being restrained by the housing to a released state of not being restrained by the housing.

11 Claims, 10 Drawing Sheets

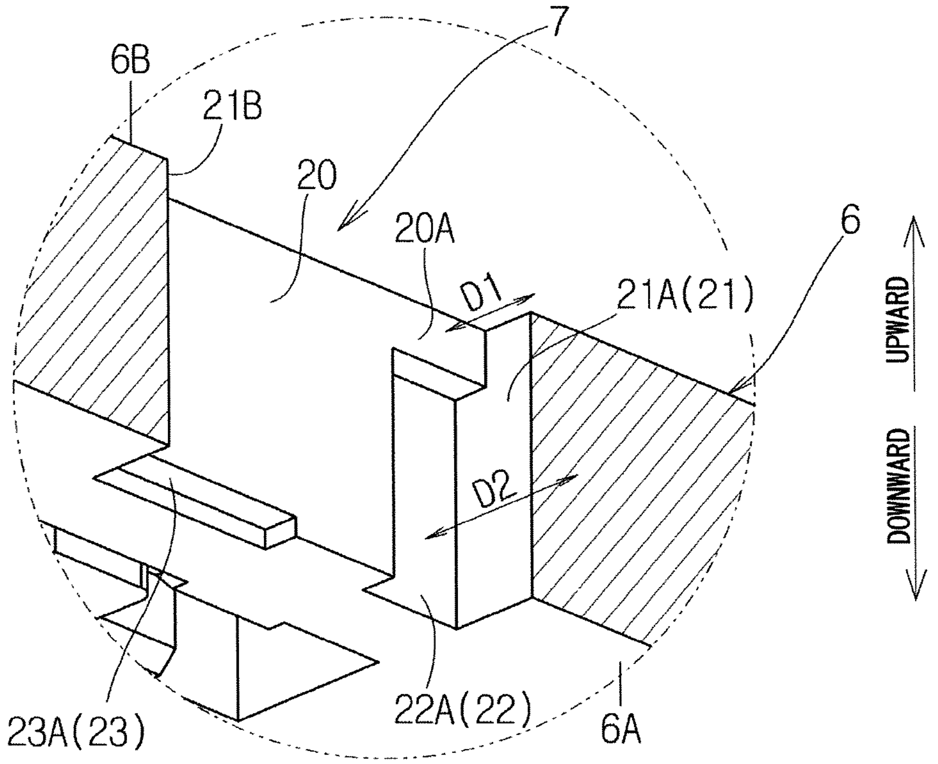
Fig. 5
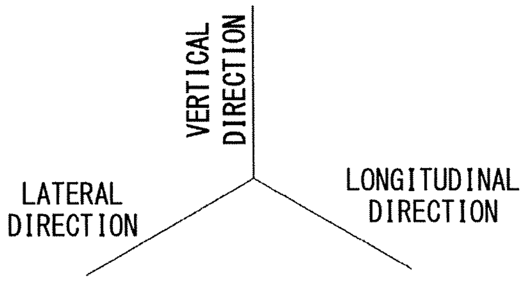

BOARD-TO-BOARD CONNECTOR

INCORPORATION BY REFERENCE

This application is based upon and claims the benefit of priority from Japanese patent application No. 2022-184706, filed on Nov. 18, 2022, the disclosure of which is incorporated herein in its entirety by reference.

BACKGROUND

The present disclosure relates to a board-to-board connector.

As shown in FIG. 10 of this application, Patent Literature 1 (the description of Chinese Utility Model No. 2736972) discloses a contact 100 for a board-to-board connector. The contact 100 includes a soldering part 101 to be soldered to a circuit board, a connecting part 102 to be held by a housing, and an elastic piece 104 having a contact part 103 in this recited order.

SUMMARY

In the contact 100 of Patent Literature 1 described above, the transmission path length from the contact part 103 to the soldering part 101 is preferably short in terms of transmission characteristics. On the other hand, the elastic piece 104 is preferably long in terms of spring characteristics. In this manner, the contact 100 of the above-described Patent Literature 1 has conflicting issues.

An object of the present disclosure is to provide a technique to achieve compatibility between transmission characteristics and spring characteristics.

According to an aspect of the present invention, there is provided a board-to-board connector mounted on a first board and interposed between the first board and a second board to electrically connect a first electrode pad of the first board and a second electrode pad of the second board, including a contact; and a housing accommodating the contact, wherein the contact includes a mounting part solderable to the first electrode pad, and a spring part extending from the mounting part, the spring part includes a contact part configured to come into contact with the second electrode pad, and a restrained part to be restrained by the housing, the mounting part is soldered to the first electrode pad in a state where the restrained part is restrained by the housing, and in a state where the mounting part is soldered to the first electrode pad, the contact part comes into contact with the second electrode pad and is displaced, and thereby the restrained part changes from a restrained state of being restrained by the housing to a released state of not being restrained by the housing.

According to the present disclosure, compatibility between transmission characteristics and spring characteristics is achieved.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 5 is a cross-sectional perspective view of the housing viewed from another angle (first embodiment);

DESCRIPTION OF EMBODIMENTS

First Embodiment

A first embodiment of the present disclosure will be described hereinafter with reference to FIGS. 1 to 8.

Figure 1:
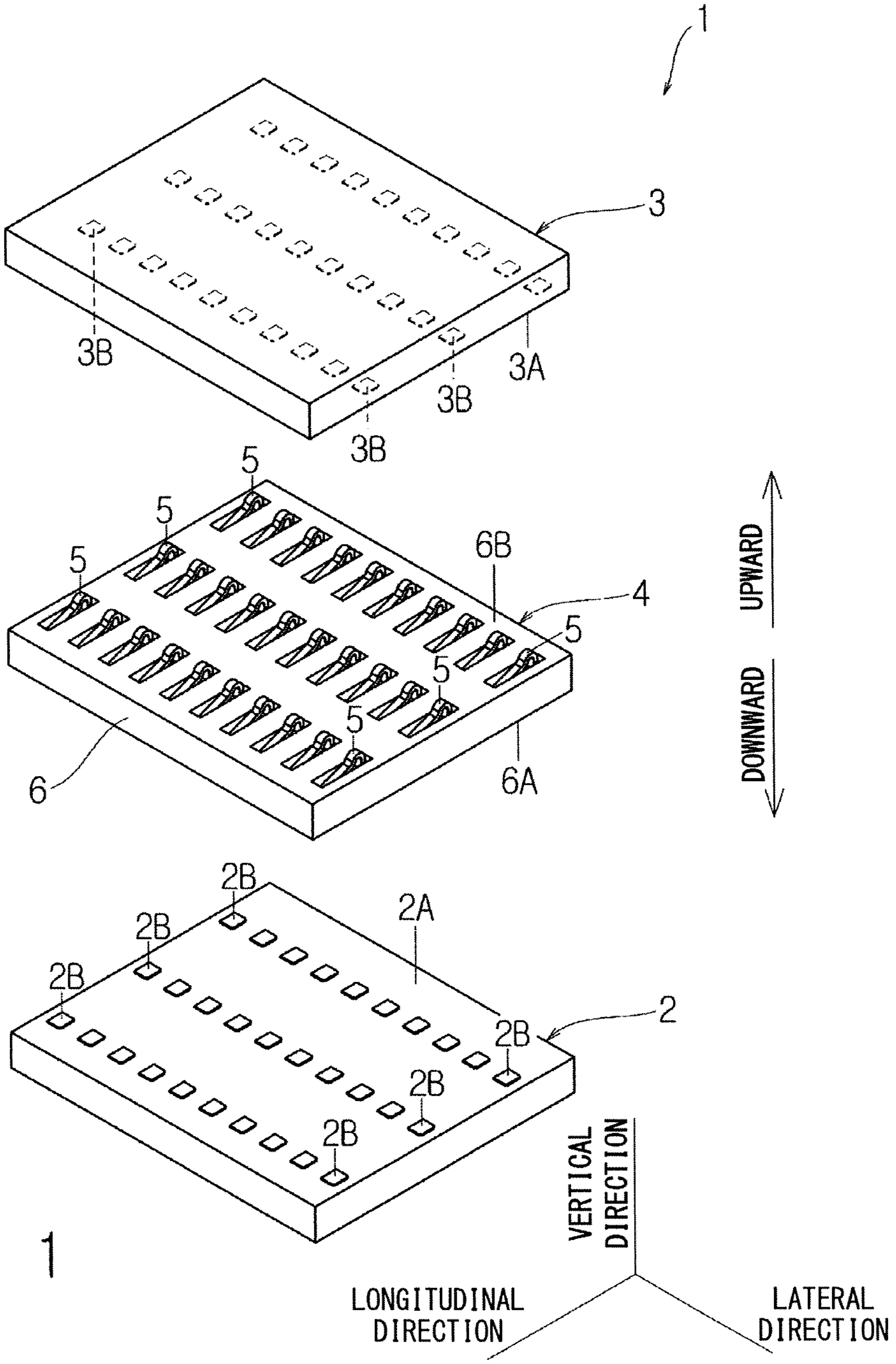
FIG. 1 is a perspective view of electronic equipment (first embodiment)

FIG. 1 shows electronic equipment 1. As shown in FIG. 1, the electronic equipment 1 includes a main board 2 (first board), a sub-board 3 (second board), and a board-to-board connector 4.

The main board 2 has a connector mounting surface 2A. A plurality of main electrode pads 2B (first electrode pads) are disposed on the connector mounting surface 2A of the main board 2.

The sub-board 3 has a connector opposed surface 3A. A plurality of sub-electrode pads 3B (second electrode pads) are disposed on the connector opposed surface 3A of the sub-board 3.

The board-to-board connector 4 is mounted on the main board 2. The board-to-board connector 4 is interposed between the main board 2 and the sub-board 3 that are parallel to each other, and thereby electrically connect the plurality of main electrode pads 2B of the main board 2 and the plurality of sub-electrode pads 3B of the sub-board 3, respectively. The direction in which the main board 2, the board-to-board connector 4, and the sub-board 3 overlap is referred to hereinafter as a vertical direction. The direction of viewing the main board 2 from the board-to-board connector 4 is referred to as downward, and the direction of viewing the sub-board 3 from the board-to-board connector 4 is referred to as upward. The upward, downward and vertical directions should not be interpreted as limiting the position of the board-to-board connector 4 during use of the board-to-board connector 4.

The board-to-board connector 4 includes a plurality of contacts that are made of metal, and a housing 6 that is made of insulating resin and accommodates the plurality of contacts 5.

The housing 6 is in a rectangular flat plate shape when viewed from above. The housing 6 includes a housing lower surface 6A facing downward and a housing upper surface 6B facing upward.

The plurality of contacts 5 are accommodated in the housing 6 in the same orientation. The longitudinal direction and the lateral direction of each contact 5 when viewed from above are hereinafter referred to simply as a longitudinal direction and a lateral direction, respectively.

Figure 2:
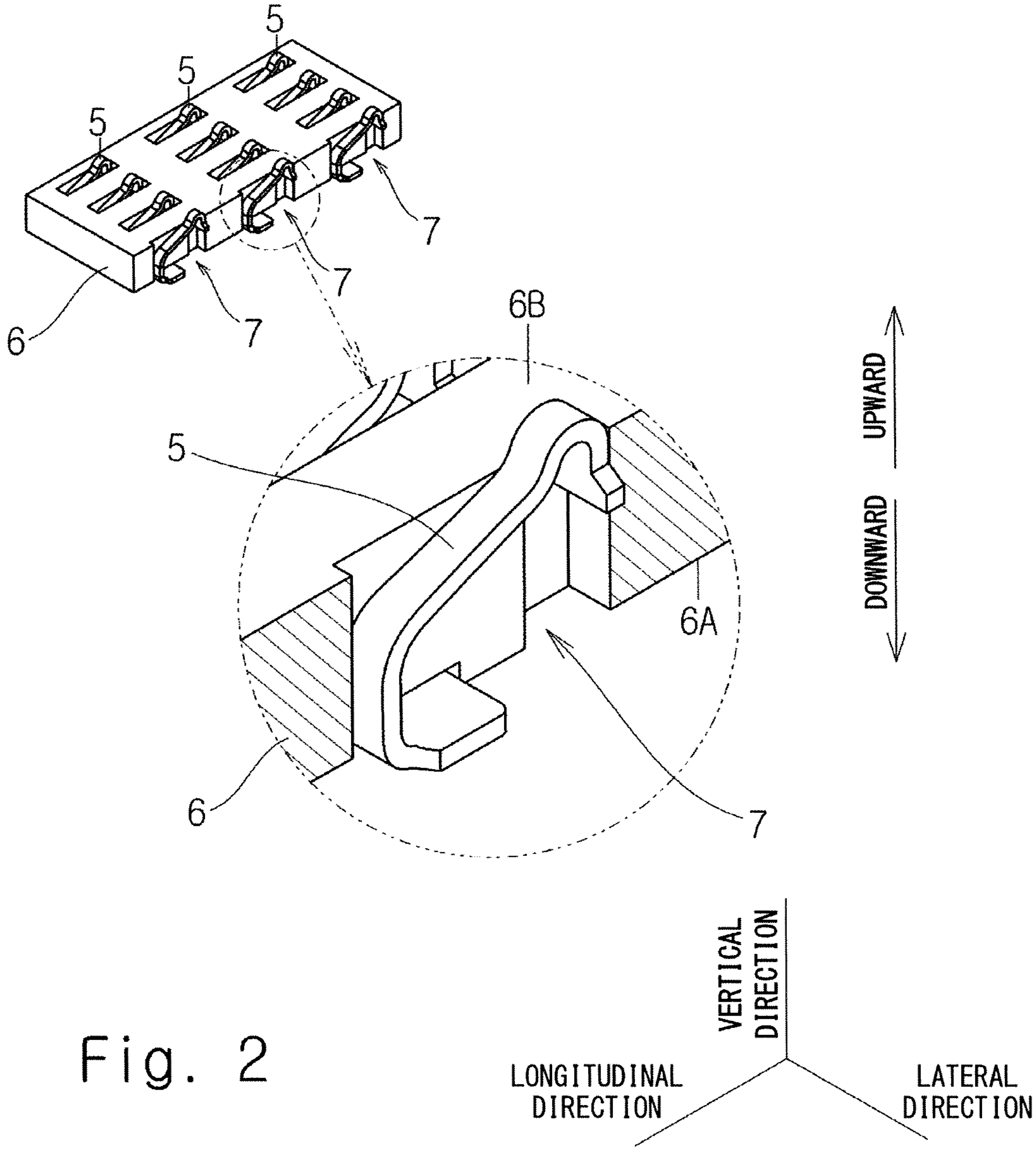
FIG. 2 is a cross-sectional perspective view of a board-to-board connector (first embodiment)

As shown in FIG. 2, the housing 6 has a plurality of cavities 7. Each cavity 7 is formed to vertically penetrate the housing 6.

Specifically, each cavity 7 is formed to open in the housing lower surface 6A and the housing upper surface 6B of the housing 6. The plurality of contacts 5 are accommodated in the plurality of cavities 7, respectively.

Figure 3:
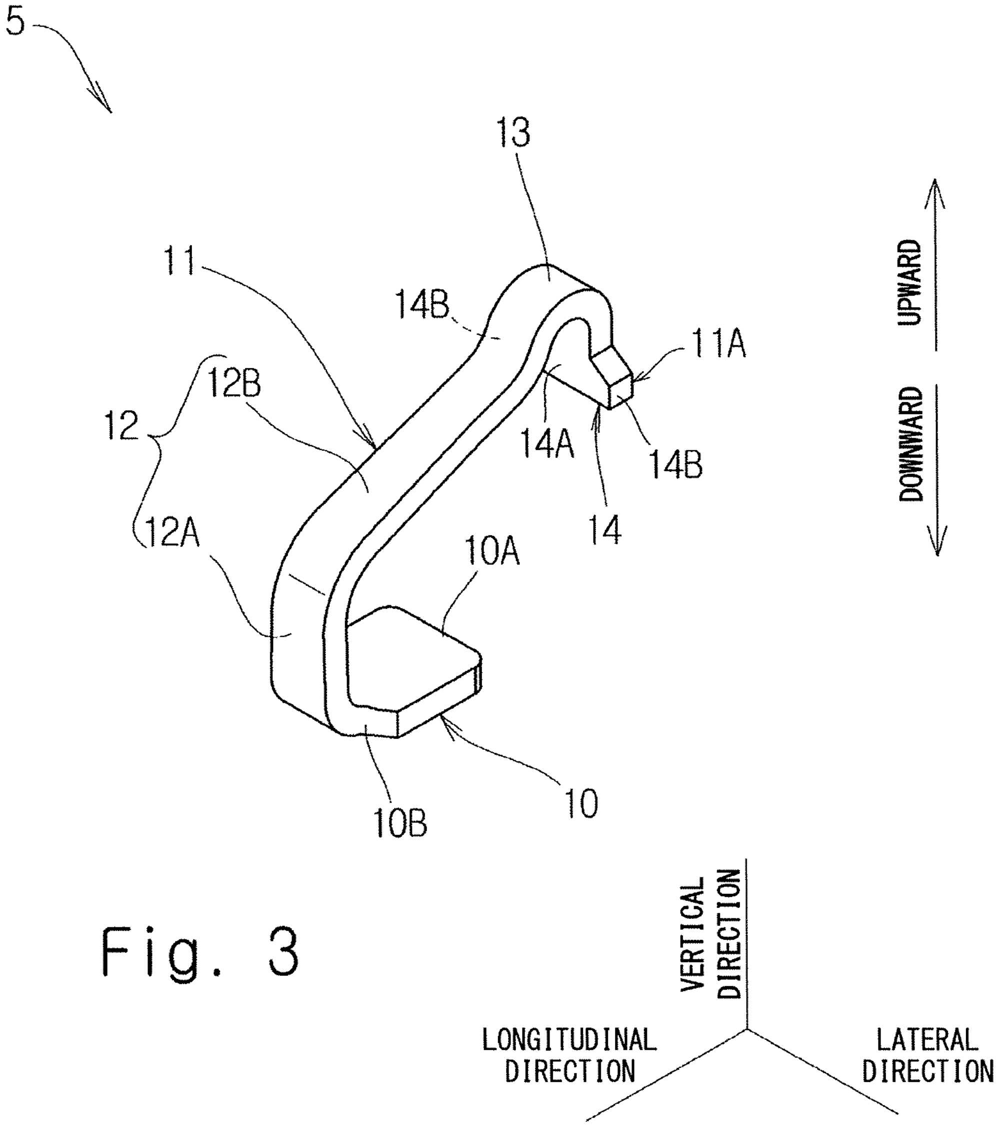
FIG. 3 is a perspective view of a contact (first embodiment)

FIG. 3 shows a perspective view of each contact 5. The plurality of contacts 5 have the same shape, and one contact 5 is described hereinafter as a representative example.

As shown in FIG. 3, the contact 5 is formed in a U shape that opens in the longitudinal direction when viewed in the lateral direction. The contact 5 is formed in line symmetry when viewed in the longitudinal direction. The contact 5 includes a mounting part 10, and a spring part 11 extending from the mounting part 10.

The mounting part 10 is a part to be soldered to the corresponding main electrode pad 2B of the main board 2 shown in FIG. 1. The thickness direction of the mounting part 10 is the same as the vertical direction. The mounting part 10 includes a front end 10A and a rear end 10B. The front end 10A and the rear end 10B are apart from each other in the longitudinal direction.

The spring part 11 extends like a cantilever from the rear end 10B of the mounting part 10. The spring part 11 includes a spring part main body 12, a contact part 13, and a restrained part 14. The spring part main body 12, the contact part 13, and the restrained part 14 link together in this recited order from the mounting part 10 to a free end 11A of the spring part 11.

The spring part main body 12 incudes a vertical part 12A and an inclined part 12B. The vertical part 12A extends upward from the rear end 10B of the mounting part 10. The inclined part 12B extends diagonally upward from an upper end of the vertical part 12A. The inclined part 12B is opposed to the mounting part 10 in the vertical direction.

The contact part 13 is a part to come into contact with the corresponding sub-electrode pad 3B of the sub-board 3 shown in FIG. 1. The contact part 13 is curved in a U shape that is convex upward.

The restrained part 14 extends downward from the contact part 13. The restrained part 14 includes a restrained part main body 14A and two press-fit claws 14B. The two press-fit claws 14B project from the restrained part main body 14A in opposite directions to each other in the lateral direction.

Figure 4:
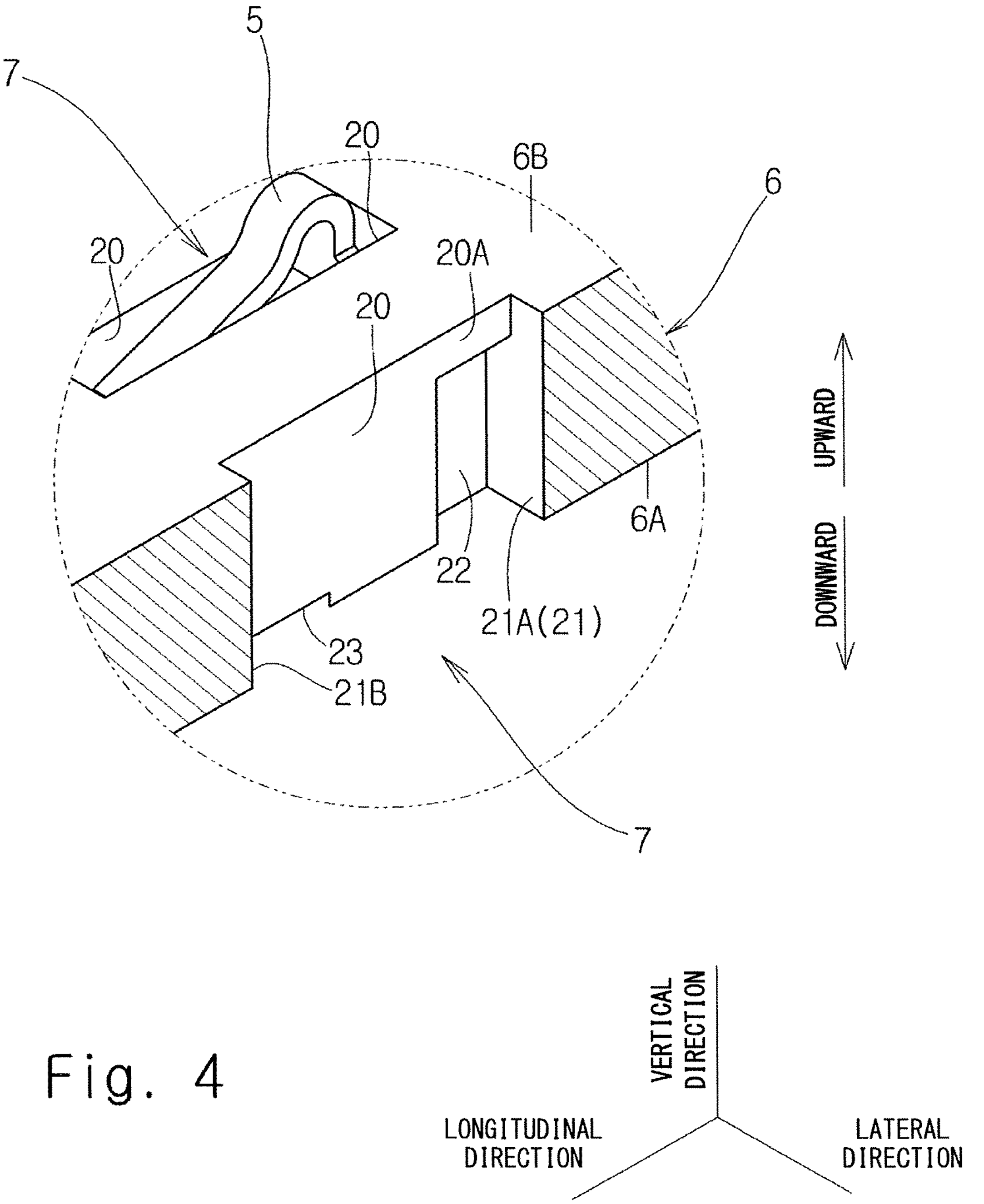
FIG. 4 is a cross-sectional perspective view of a housing (first embodiment)

FIGS. 4 and 5 are perspective views of each cavity 7. The plurality of cavities 7 have the same shape, and one cavity 7 is described hereinafter as a representative example.

As shown in FIGS. 4 and 5, the housing 6 includes two lateral inner surfaces 20 that define the cavity 7 in the lateral direction and two longitudinal inner surfaces 21 that define the cavity 7 in the longitudinal direction. The two longitudinal inner surfaces 21 include a front longitudinal inner surface 21A and a rear longitudinal inner surface 21B.

Each of the lateral inner surfaces 20 includes a front recess 22 and a rear recess 23.

The front recess 22 is formed to open downward in an area of each lateral inner surface 20 that touches the front longitudinal inner surface 21A. Thus, each lateral inner surface 20 has a press-fit surface 20A that touches the front recess 22 in the vertical direction. Specifically, the front recess 22 is formed below the press-fit surface 20A. As shown in FIG. 5, a distance D1 between the press-fit surfaces 20A of the two lateral inner surfaces 20 opposed to each other in the lateral direction is shorter than a distance D2 between bottom surfaces 22A of the two front recesses 22 opposed to each other in the lateral direction.

The rear recess 23 is formed to open downward in an area of each lateral inner surface 20 that touches the rear longitudinal inner surface 21B. The housing 6 has a positioning surface 23A that defines the rear recess 23 in the vertical direction.

A method of manufacturing the board-to-board connector 4 is described hereinafter with reference to FIG. 6.

First, the housing 6 is manufactured by injection molding. At the same time, the plurality of contacts 5 are manufactured by punching and bending one metal plate. Although the plurality of contacts 5 are typically coupled to one another by carriers, the description of carriers is omitted.

Next, each contact 5 is accommodated into each cavity 7. To be specific, as shown in FIG. 6, each contact 5 is accommodated into each cavity 7 by running the contact 5 through an opening 7A of the housing lower surface 6A of each cavity 7 and moving it upward relative to the housing 6.

At this time, the restrained part 14 moves upward relative to the housing 6 as it is opposed to the bottom surfaces 22A of the two front recesses 22 opposed to each other in the lateral direction, and is then press-fit into the two press-fit surfaces 20A opposed to each other in the lateral direction. Specifically, each press-fit claw 14B of the restrained part 14 is press-fit to the corresponding press-fit surface 20A from below. During the press-fitting, the mounting part 10 comes into plane contact with the positioning surface 23A of the rear recess 23, and the mounting part 10 is thereby in position in the vertical direction at the time of the press-fitting. As a result, the contact 5 serves as a cantilever where the restrained part 14 is fixed to the housing 6. In this state, the mounting part 10 can be slightly separated downward from the positioning surface 23A of the rear recess 23 due to the self-weight of the contact 5 in some cases. Further, the contact part 13 projects upward beyond the housing upper surface 6B.

How to use the board-to-board connector 4 is described hereinafter with reference to FIGS. 7 and 8.

Figure 7:
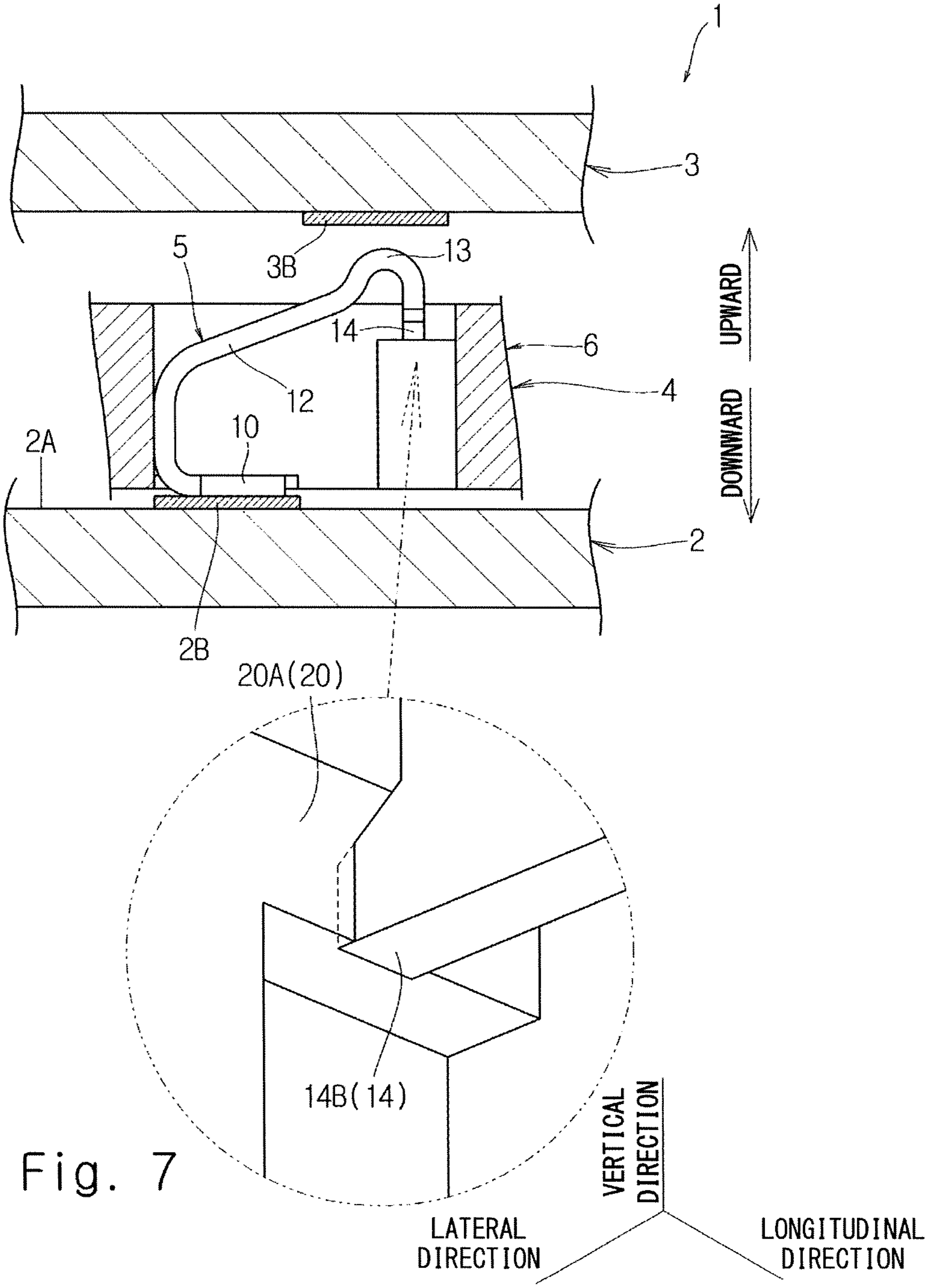
FIG. 7 is a view showing usage of the board-to-board connector (first embodiment)

First, as shown in FIG. 7, the board-to-board connector 4 is mounted on the connector mounting surface 2A of the main board 2. To be specific, the mounting part 10 of each contact 5 is soldered to the corresponding main electrode pad 2B. At this time, the two press-fit claws 14B of the restrained part 14 are press-fit to the two press-fit surfaces 20A opposed to each other. In other word, the mounting part is soldered to the main electrode pad 2B in the state where the restrained part 14 is restrained by the housing 6.

Next, the sub-electrode pad 3B of the sub-board 3 is opposed to the contact part 13 in the vertical direction, and the sub-board 3 is pressed against the board-to-board connector 4. Then, the sub-electrode pad 3B comes into contact with the contact part 13, and the contact part 13 is displaced downward. Accordingly, as shown in FIG. 8, the two press-fit claws 14B of the restrained part 14 are moved downward, and separated from the two press-fit surfaces 20A opposed to each other, respectively. In other word, when the contact part 13 is displaced downward, the restrained part 14 changes from a restrained state where it is restrained by the housing 6 as shown in FIG. 7 to a released state where it is not restrained by the housing 6 as shown in FIG. 8. When each press-fit claw 14B is separated downward from the corresponding press-fit surface 20A, a trace 20B of press fitting is left on each press-fit surface 20A.

In this manner, when the restrained part 14 changes from the restrained state to the released state, the contact 5 changes from a double fixed beam state where the restrained part 14 is fixed to the housing 6 and the mounting part 10 is fixed to the main board 2 to a cantilever state where the restrained part 14 is a free end and the mounting part 10 is fixed to the main board 2.

Figure 8:
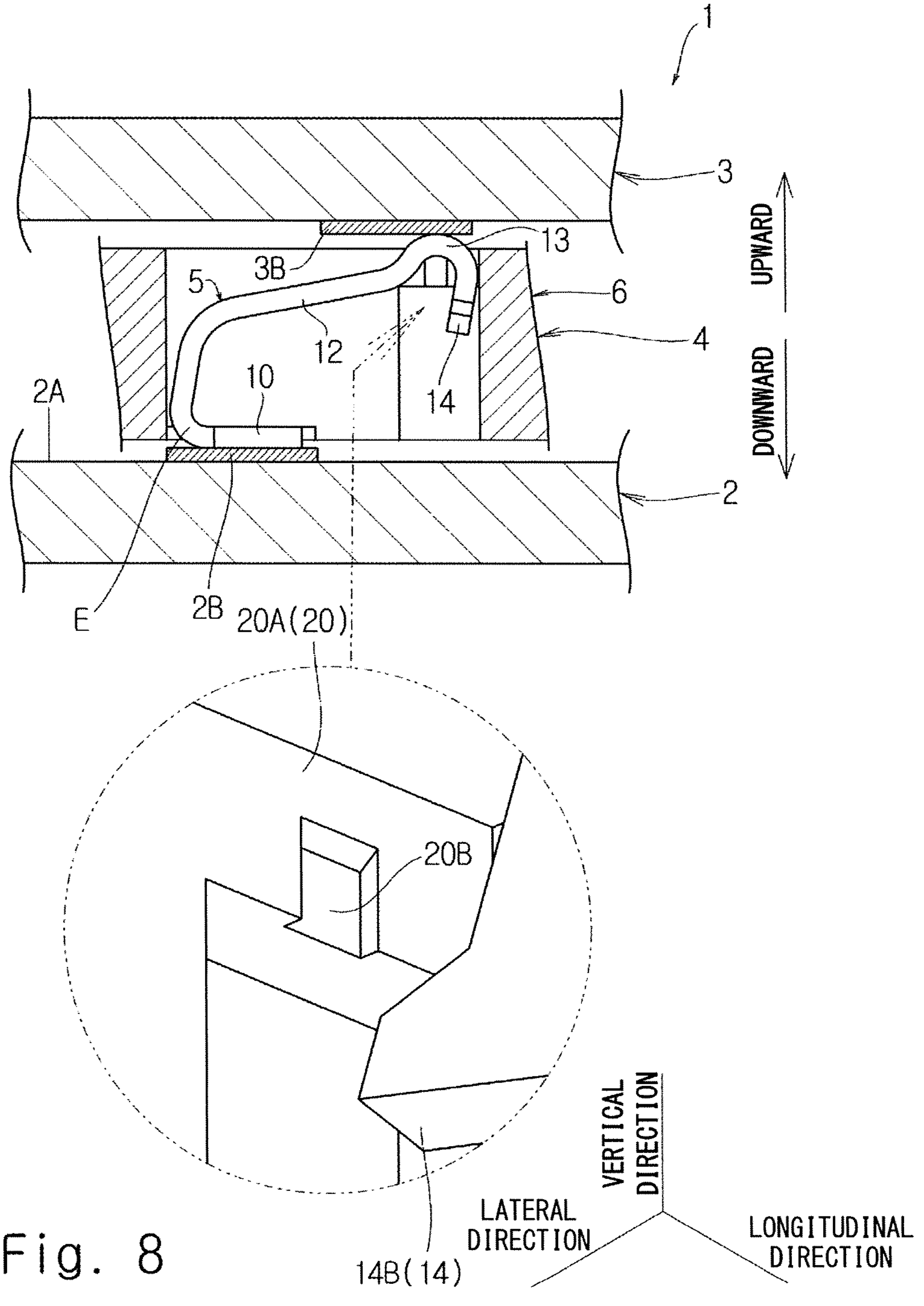
FIG. 8 is a view showing usage of the board-to-board connector (first embodiment)

As shown in FIGS. 7 and 8, when the contact part 13 is displaced downward, the restrained part 14 promptly changes from the restrained state to the released state in the early stage of displacement. Thus, when the contact part 13 is displaced downward, the entire spring part main body 12 is elastically deformed. Since the entire spring part main body 12 is elastically deformed, a stress generated in the spring part main body 12 is reduced. In other words, the spring characteristics of the contact 5 is improved. Of special note is that there is no need to extend the transmission path length from the contact part 13 to the mounting part 10 to improve the spring characteristics of the contact 5. Therefore, this structure achieves high transmission characteristics and good spring characteristics at the same time.

Note that, when the sub-board 3 is detached upward from the board-to-board connector 4, each press-fit claw 14B shown in FIG. 8 is not reinserted into the corresponding trace 20B of press-fitting. This is because the trace 20B of press-fitting runs vertically while a path of the restrained part 14 when the contact part 13 is displaced in the vertical direction in FIG. 8 is substantially a circular path centering on a boundary E between the mounting part 10 and the spring part 11.

The first embodiment of the present disclosure is described above. The above-described first embodiment has the following features.

As shown in FIG. 1, the board-to-board connector 4 is mounted on the main board 2 (first board) and interposed between the main board 2 and the sub-board 3 (second board) to electrically connect the main electrode pads 2B (first electrode pads) of the main board 2 and the sub-electrode pads 3B (second electrode pads) of the sub-board 3, respectively. The board-to-board connector 4 includes the contact 5 and the housing 6 that accommodates the contact 5. The contact 5 includes the mounting part 10 that is solderable to the main electrode pad 2B and the spring part 11 that extends from the mounting part 10. The spring part 11 includes the contact part 13 configured to come into contact with the sub-electrode pad 3B and the restrained part 14 to be restrained by the housing 6. Then, as shown in FIG. 7, the mounting part 10 is soldered to the main electrode pad 2B in the state where the restrained part 14 is restrained by the housing 6. As shown in FIG. 8, in the state where the mounting part 10 is soldered to the main electrode pad 2B, the contact part 13 comes into contact with the sub-electrode pad 3B and is displaced, and thereby the restrained part 14 changes from the restrained state where it is restrained by the housing 6 to the released state where it is not restrained by the housing 6. In this structure, in each contact 5 of the board-to-board connector 4, high transmission characteristics and good spring characteristics are achieved at the same time.

Further, as shown in FIG. 7, the restrained part 14 is restrained by the housing 6 by press-fitting. This structure allows the restrained part 14 to be restrained by the housing 6 in a simple way.

Further, as shown in FIG. 2, the housing 6 includes the housing lower surface 6A opposed to the main board 2 and the housing upper surface 6B opposed to the sub-board 3. As shown in FIG. 6, the restrained part 14 is press-fit upward into the housing 6. As shown in FIGS. 7 and 8, the restrained part 14 changes from the restrained state to the released state as the contact part 13 is displaced downward. In this structure, the direction in which the restrained part 14 is press-fit and the direction in which the restrained part 14 is separated from the housing 6 are opposite, which allows the restrained part 14 to become separated from the housing 6 with a small force.

Further, as shown in FIG. 7, the contact part 13 projects upward beyond the housing upper surface 6B. This structure allows the contact part 13 to be easily displaced downward.

Further, as shown in FIG. 3, the restrained part 14 is placed near the contact part 13. In this structure, a downward displacement amount of the contact part 13 when the contact part 13 is displaced downward and a downward displacement amount of the restrained part 14 when the contact part 13 is displaced downward are approximate. This allows the restrained part 14 to become separated from the housing 6 efficiently compared with the case where the restrained part 14 is placed away from the contact part 13.

Further, as shown in FIG. 3, the restrained part 14 is closer to the free end 11A of the spring part 11 than the contact part 13. This structure eliminates the need to take the restrained part 14 into consideration when designing the spring part main body 12, and therefore the spring part main body 12 is easily designed compared with the case where the restrained part 14 is placed at the spring part main body 12. Note that, however, the restrained part 14 may be placed at the spring part main body 12.

Further, as shown in FIG. 3, the restrained part 14 is placed at the free end 11A of the spring part 11. In this structure, the restrained part 14 is easily pressed upward using a jig when press-fitting the restrained part 14 into the housing 6.

Second Embodiment

A second embodiment will be described hereinafter with reference to FIG. 9. Differences of this embodiment from the above-described first embodiment are mainly described below, and redundant description thereof is omitted.

Figure 6:
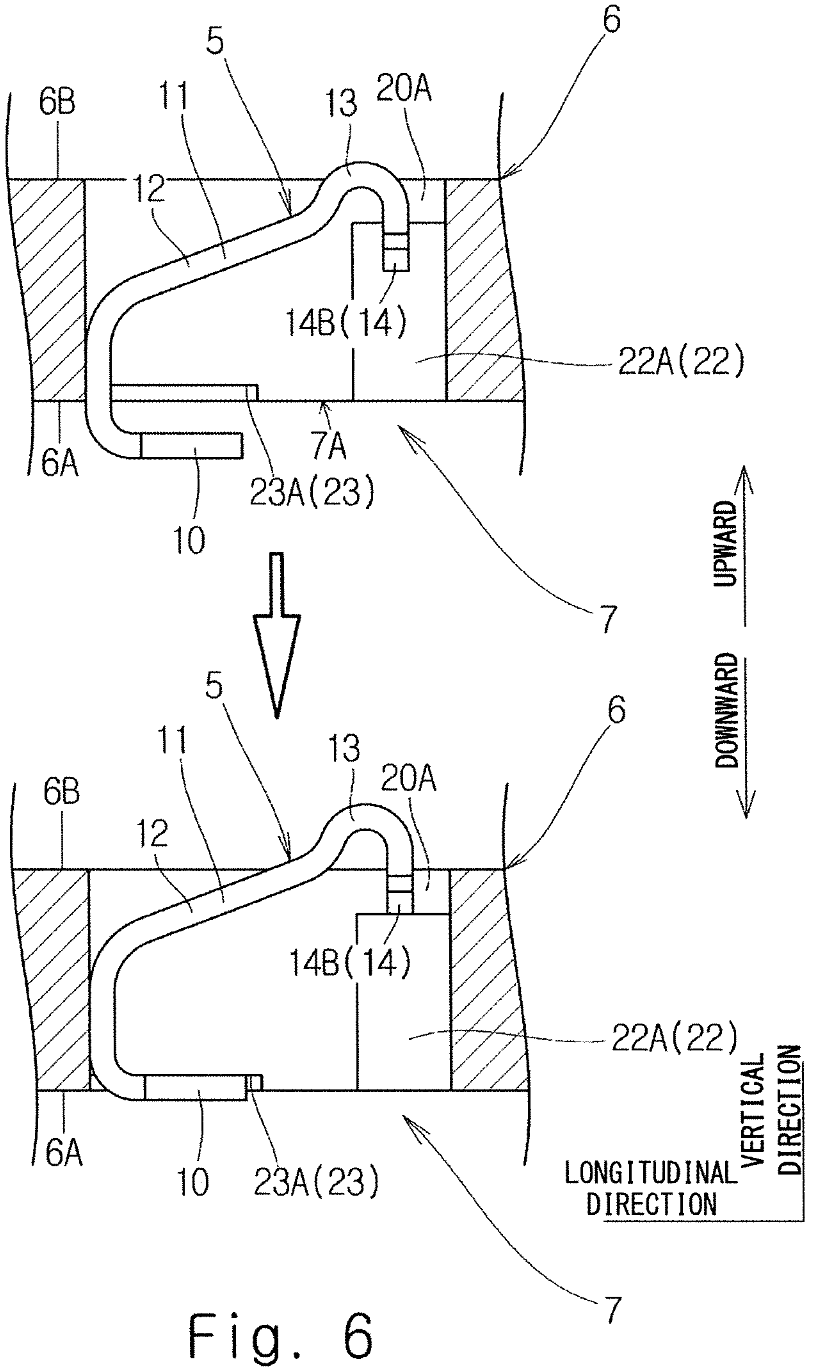
FIG. 6 is a view showing a manufacturing flow of a board-to-board connector (first embodiment)

In the first embodiment, the restrained part 14 is restrained by the housing 6 by press fitting as shown in FIG. 6, for example.

Figure 9:
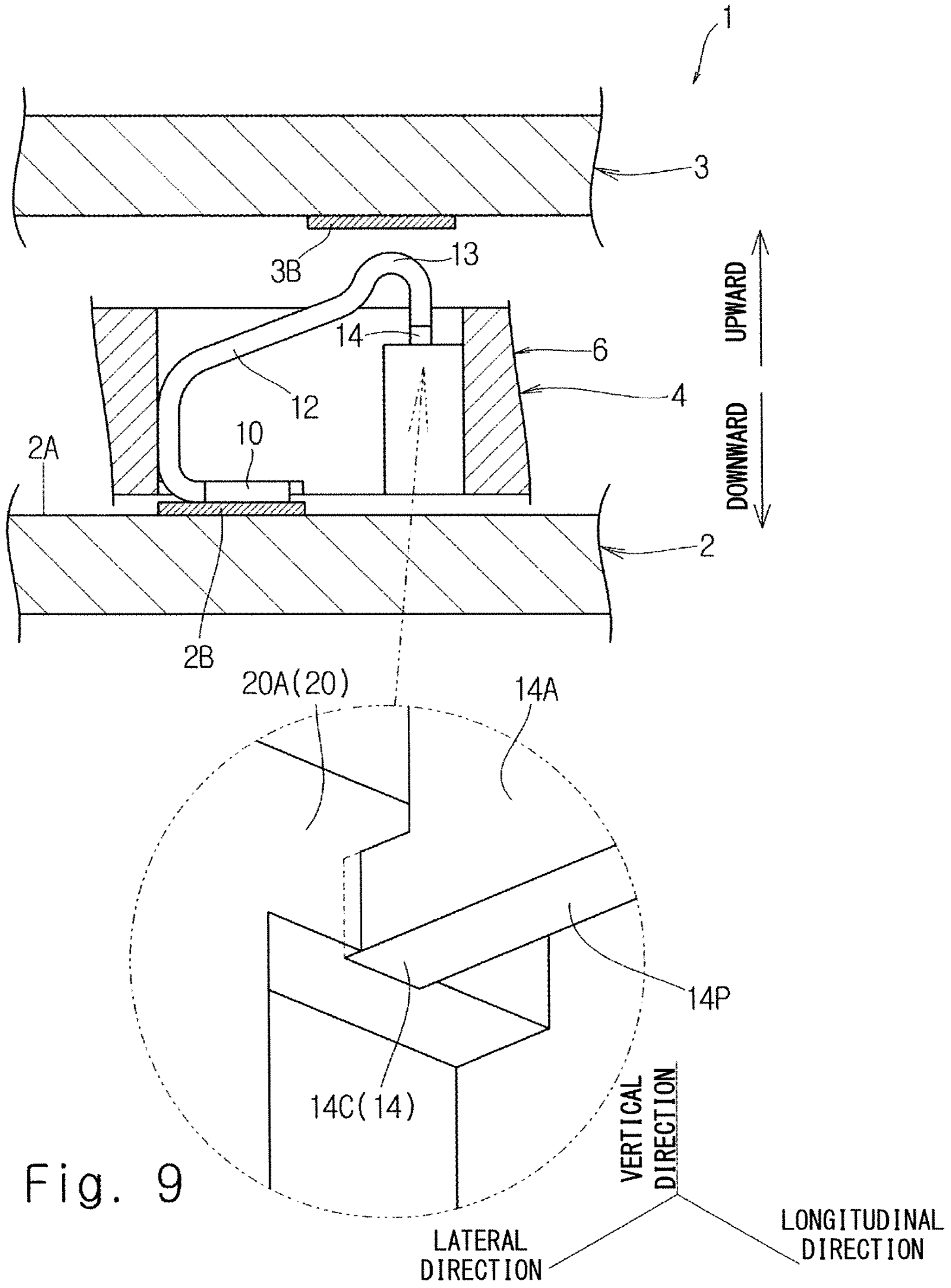
FIG. 9 is a cross-sectional perspective view of a board-to-board connector (second embodiment)
Figure 10:
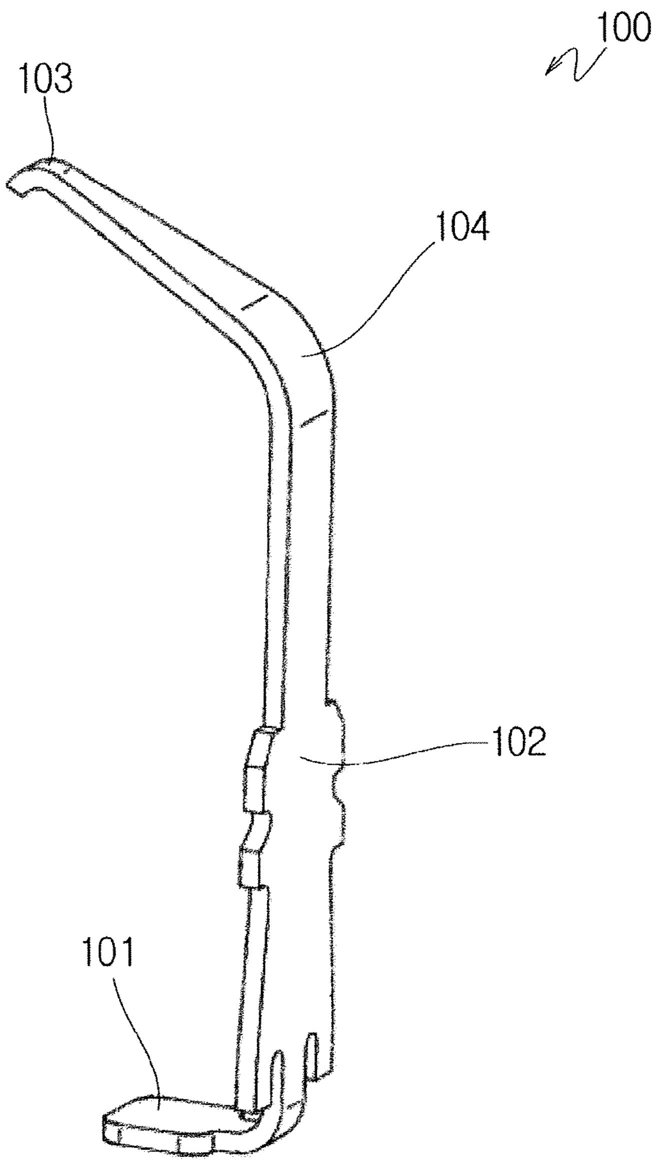
FIG. 10 is a view showing a simplified version of FIG. 1 of Patent Literature 1.

On the other hand, in this embodiment, the restrained part 14 is restrained by the housing 6 by insert molding as shown in FIG. 9.

To be specific, the restrained part 14 includes a restrained part main body 14A and two buried parts 14C. The two buried parts 14C project from the restrained part main body 14A in opposite directions to each other in the lateral direction.

When manufacturing the board-to-board connector 4, the housing 6 and the plurality of contacts 5 are integrally formed by insert molding. Specifically, as shown in FIG. 9, insert molding is done in such a way that the two buried parts 14C penetrate the press-fit surface 20A. In the state of FIG. 9, a lower surface 14P of the restrained part 14 is exposed downward without being covered by the housing 6. The lower surface 14P of the restrained part 14 is made up of a lower surface of the restrained part main body 14A of the restrained part 14 and lower surfaces of the two buried parts 14C of the restrained part 14. In this manner, the restrained part 14 is exposed downward from the housing 6 in the state where it is restrained by the housing 6, which allows the restrained part 14 to become easily separated downward from the housing 6 just like in the above-described first embodiment.

The second embodiment of the present disclosure is described above. The above-described second embodiment has the following features.

As shown in FIG. 9, the restrained part 14 is restrained by the housing 6 by insert molding. In this structure, there is no need to press-fit the restrained part 14 to the housing 6, which avoids various difficulties caused by press fitting.

Further, the restrained part 14 is exposed downward from the housing 6 in the state where it is restrained by the housing 6. In this structure, the restrained part 14 is easily separable downward from the housing 6.

Further, the restrained part 14 changes from the restrained state to the released state as the contact part 13 is displaced downward. This structure allows the restrained part 14 to change from the restrained state to the released state simply by pressing the sub-board 3 against the board-to-board connector 4.

Further, the contact part 13 projects upward beyond the housing upper surface 6B. This structure allows the contact part 13 to be easily displaced downward.

The first and second embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A board-to-board connector mounted on a first board and interposed between the first board and a second board to electrically connect a first electrode pad of the first board and a second electrode pad of the second board, comprising:
- a contact; and
- a housing accommodating the contact, wherein
- the contact includes
  - a mounting part solderable to the first electrode pad, and
  - a spring part extending from the mounting part,
- the spring part includes
  - a contact part configured to come into contact with the second electrode pad, and
  - a restrained part to be restrained by the housing,
- the mounting part is soldered to the first electrode pad in a state where the restrained part is restrained by the housing, and
- in a state where the mounting part is soldered to the first electrode pad, the contact part comes into contact with the second electrode pad and is displaced, and thereby the restrained part changes from a restrained state of being restrained by the housing to a released state of not being restrained by the housing.

2. The board-to-board connector according to claim 1, wherein the restrained part is restrained by the housing by press fitting.

3. The board-to-board connector according to claim 2, wherein
- the housing includes a housing lower surface opposed to the first board and a housing upper surface opposed to the second board,
- the restrained part is press-fit to the housing in a direction of viewing the housing upper surface from the housing lower surface, and
- the restrained part changes from the restrained state to the released state as the contact part is displaced in a direction of viewing the housing lower surface from the housing upper surface.

4. The board-to-board connector according to claim 3, wherein the contact part projects beyond the housing upper surface in the direction of viewing the housing upper surface from the housing lower surface.

5. The board-to-board connector according to claim 1, wherein the restrained part is restrained by the housing by insert molding.

6. The board-to-board connector according to claim 5, wherein
- the housing includes a housing lower surface opposed to the first board and a housing upper surface opposed to the second board, and
- the restrained part is exposed from the housing in a direction of viewing the housing lower surface from the housing upper surface in the state of being restrained by the housing.

7. The board-to-board connector according to claim 6, wherein the restrained part changes from the restrained state to the released state as the contact part is displaced in the direction of viewing the housing lower surface from the housing upper surface.

8. The board-to-board connector according to claim 7, wherein the contact part projects beyond the housing upper surface in a direction of viewing the housing upper surface from the housing lower surface.

9. The board-to-board connector according to claim 1, wherein the restrained part is placed near the contact part.

10. The board-to-board connector according to claim 1, wherein the restrained part is closer to a free end of the spring part than the contact part.

11. The board-to-board connector according to claim 1, wherein the restrained part is placed at a free end of the spring part.

* * * * *